(12) United States Patent
Zheng

(10) Patent No.: US 6,801,573 B2
(45) Date of Patent: Oct. 5, 2004

(54) METHOD FOR DYNAMIC 3D WAVELET TRANSFORM FOR VIDEO COMPRESSION

(75) Inventor: Yuan F. Zheng, Columbus, OH (US)

(73) Assignee: The Ohio State University, Columbus, OH (US)

( * ) Notice: Subject to any disclaimer, the term of this patent is extended or adjusted under 35 U.S.C. 154(b) by 799 days.

(21) Appl. No.: 09/746,334

(22) Filed: Dec. 21, 2000

(65) Prior Publication Data

US 2002/0101929 A1 Aug. 1, 2002

(51) Int. Cl.⁷ .......................... H04N 1/66; G06K 9/36
(52) U.S. Cl. .................... 375/240.11; 382/240
(58) Field of Search ............ 375/240.01, 240.09, 375/240.1, 240.11, 240.13, 240.14, 240.15, 240.16, 240.17, 240.21; 348/409.1, 410.1, 411.1, 412.1, 415.1; 382/239, 240; H04B 1/66; G06K 9/30

(56) References Cited

U.S. PATENT DOCUMENTS

| | | | |
|---|---|---|---|
| 5,315,670 A | 5/1994 | Shapiro | 382/240 |
| 5,321,776 A | 6/1994 | Shapiro | 382/240 |
| 5,412,741 A | 5/1995 | Shapiro | 382/232 |
| 5,757,974 A | 5/1998 | Impagliazzo et al. | 382/248 |
| 5,841,473 A | 11/1998 | Chui et al. | 348/390 |
| 5,946,417 A | 8/1999 | Bonneau et al. | 382/236 |
| 6,031,937 A | 2/2000 | Graffagnino | 382/236 |
| 6,031,940 A | 2/2000 | Chui et al. | 382/240 |
| 6,069,977 A | 5/2000 | Kim et al. | 382/240 |
| 6,091,777 A | 7/2000 | Guetz et al. | 375/240 |
| 6,101,284 A | 8/2000 | Matsubara et al. | 382/260 |
| 6,154,493 A | 11/2000 | Acharya et al. | 375/240.19 |
| 6,501,859 B1 * | 12/2002 | Kajiwara | 382/239 |
| 6,519,284 B1 * | 2/2003 | Pesquet-Popescu et al. | 375/240.11 |
| 2002/0006229 A1 * | 1/2002 | Chao et al. | 382/240 |
| 2002/0101929 A1 * | 8/2002 | Zheng | 375/240.21 |

OTHER PUBLICATIONS

Lin, C. et al., *Packed Integer Wavelet Transform Constructed by Lifting Scheme*, Proc. 1999 Int'l Conference on Acoustics, Speech & Signal Processing, Mar. 15, 1999, pp. 3177–3180.

* cited by examiner

Primary Examiner—Tung T. Vo
(74) Attorney, Agent, or Firm—Stadley Law Group LLP

(57) ABSTRACT

A dynamic 3D wavelet transform system and method for compressing video including color or black and white signal. The method applies a so-called packed integer wavelet transform to individual video frames to generate wavelet coefficients in the spatial domain (x and y directions). The generated wavelet coefficients are compared to determine if a new frame is similar in content with the previous frame. All the similar frames are grouped together for performing the wavelet transform in the temporal domain (t direction). A frame with different content will start a new group until another different frame is reached. The comparison is based on the information of the Low-Low (LL) band in the output of the wavelet transform of each frame instead of the entire frame. The coefficients generated by the wavelet transform in the spatial domain are quantized before the wavelet transform in the temporal domain is applied to them The methods allow a hybrid 2D and 3D compression. The 2D wavelet transform is first performed on each frame to obtain the LL, LH, HL, and HH bands. The wavelet transform is further applied in the temporal domain in the LL band only. Compression is achieved based on the 2D wavelet transform in the LH, HL, and HH bands, and 3D wavelet transform in the LL band. Using the LL band reduces the operation space and computation time for the wavelet transform while still achieving a high compression ratio because the wavelet coefficients in the LH, HL, and HH bands are sparse.

22 Claims, 5 Drawing Sheets

METHOD FOR DYNAMIC 3D WAVELET TRANSFORM FOR VIDEO COMPRESSION

This invention was made with Government support under Grant Nos. RF 737090 and 738059, awarded by the United States Air Force. The Government has certain rights in this invention.

RELATED PUBLICATIONS

1. ISO/IEC 11172-2, Coding of moving pictures and associated audio for digital storage media at up to 1.5 Mbps. Technical Report, MPEG (Moving Pictures Expert Group), International Organization for Standardization, 1993.
2. Dldler Le Gall, "MPEG: a video compression standard for multimedia applications," Communications of the ACM, Vol. 34, No. 4, pp. 47–63, April, 1991.
3. ISO/IEC 13818-2, Generic coding of moving pictures and associated audio information. Technical Report, MPEG (Moving Pictures Expert Group), International Organization for Standardization, 1994.
4. ISO/IECJTC1/SC29/WG11 N2725, Overview of the MPEG-4 standard, 1999.
5. I. Daubechies and W. Sweldens, "Factoring wavelet transforms into lifting steps," J. Fouries Anal. Appl., 4(no.3), pp. 247–269, 1998.
6. M. Tsai, J. Villasenor, and F. Chen, "Stark-run image coding," IEEE Trans. on Circuits and Systems for Video Technology, 6(5): 519–521, 1996.

FIELD OF INVENTION

The present invention relates to the field of video compression. More particularly, the present invention relates to a method for video compression using dynamic 3D wavelet transform.

BACKGROUND OF THE PRIOR ART

Video is a data-rich medium that results in the creation of large files in a computer system. Video data requires a large memory space to store in the computer or an extremely wide bandwidth to transmit on the Internet. Video compression is a method for reducing the amount of data that represents the video such that one can enjoy the video even with a small memory space plus a narrow bandwidth. One parameter to measure the performance of a compression scheme is the "compression ratio" which reflects the ratio of the size of the original video to the size of the compressed file.

Many video compression approaches are based on discrete cosine transform (DCT), which has a number of unique features. The most important one is the block-based implementation that divides the image into blocks of 8 by 8 pixels. DCT is then performed on the blocks individually. Blocks also support a motion compensation scheme by identifying the motions of blocks between two frames, which further increase the compression ratio. The DCT based approach has generated a number of industrial standards including MPEG-1, MPEG-2, and MPEG-4. MPEG-1 ([1]) is a derivative of the H.261 specification. It can compress video signal to the rate of 1–1.5 Mbps with reasonably good quality ([2]). MPEG-2 ([3]) retains the coding technique of MPEG-1 but is a considerable improvement over MPEG-1 by supporting larger frames. The newly announced MPEG-4 further improves MPEG-2 by introducing content-based compression ([4]).

The block-based DCT approach has a major disadvantage. It generates the block artifacts, especially at a high compression ratio. The artifacts significantly reduce the quality of the video and are unpleasant to the eyes. Wavelet transform is a new approach for image and video compression emerging in recent years. It has been proven superior to the DCT approach for the following reasons:

a. The wavelet transform is applied to the entire image; it thus avoids the block artifacts.
b. The wavelet transform localizes signal characteristics in both the spatial and temporal domains and can most efficiently explore the spatial redundancy to achieve the highest compression ratio.
c. The wavelet transform decomposes an image into a low resolution version of the image along with a series of enhancements that add fine details. Thus, the wavelet transform can support continuous rate scalibility.

A number of compression schemes based on wavelet transform have been developed including U.S. Pat. Nos. 5,315,670, 5,321,776, and 5,412,741 for a so-called zero-tree structure plus 5,757,974, 6,031,937, 6,091,777, and 6,101,284. All of these compression schemes have ignored an important aspect of compression. They do not fully exploit the redundancy in the temporal domain. In these approaches, either no wavelet transform is considered in the temporal domain or only a random number of frames are included in the temporal domain (the third dimension) for the wavelet transform.

In the MPEG approach, the redundancy in the temporal domain is reduced by examining the similarity among eight consecutive frames (so-called I, B, and P frames). The compression ratio is limited to 8:1 even if all eight frames are identical. There may be hundreds of consecutive frames which are similar in a video sequence. If these frames are included in the same group for the 3D wavelet transform, the compression ratio can be significantly increased. On the other hand, if grouping is random, the 3D wavelet transform does not produce the highest compression ratio.

SUMMARY OF THE INVENTION

The solution for the problems described above is the Dynamic 3D Wavelet Transform scheme of the present invention, which includes only those consecutive frames that are similar in a single group. Because the number of frames may be different between groups, it is called dynamic 3D wavelet transform.

The present invention provides a method which takes full advantage of the wavelet transform in the temporal domain. The method first applies the wavelet transform in the spatial domain (x and y directions) called 2D wavelet transform. The 2D wavelet transform generates four frequency bands, low-low (LL), low-high (LH), high-low (HL), and high-high (HH) bands. The 2D wavelet transform can be applied to the LL band again to produce additional four bands within the LL band. This process can continue until the generated LL band is sufficiently small.

The first LL band of a current frame is compared with the LL band of the next frame to determine a difference between the two. If the difference is less than a threshold, the next frame is considered similar to the current frame. This process continues until the next frame is dissimilar. All similar frames are put together in the original order and form a frame group. In the temporal domain, the wavelet transform is applied to the pixels of the frames that have identical x and y positions. Because the frames are similar, the intensity of the pixels at the same position may have no or little change, and the number of pixels which do change is small. As a result, the wavelet transform in the temporal domain generates the maximum compression ratio.

It is possible that the number of similar frames is very large. The memory space is not large enough to hold all the frames. This problem is solved by using a 2D–3D hybrid approach. That is, only the LL band generated by the first wavelet transform is involved in the 3D wavelet transform. The coefficients of the LH, HL, and HH bands are quantized and encoded. The encoded coefficients are either transmitted to a receiver or stored in the disk without further wavelet transform. This approach reduces the memory space and computation time for performing the 3D wavelet transform. Because the coefficients in the LH, HL, and HH are smaller than those in the LL band and many of them are eliminated after the quantization, high compression ratio can be achieved in those three bands even without the 3D wavelet transform. If the original frame is small, the 3D wavelet transform can still be applied to all four bands.

In order to control the compression ratio in the spatial and temporal domains separately, the wavelet coefficients generated in the spatial domain is quantized first before the wavelet transform in the t (time) direction is applied. Quantization is then applied to the wavelet coefficients generated in the third and final wavelet transform. In this way, the quantization step can be performed twice, in the spatial and temporal domains, respectively. One may choose not to separate the two quantization steps, but instead perform one step to the final result of the 3D wavelet transform.

DETAILED DESCRIPTION OF THE INVENTION

Figure 1:
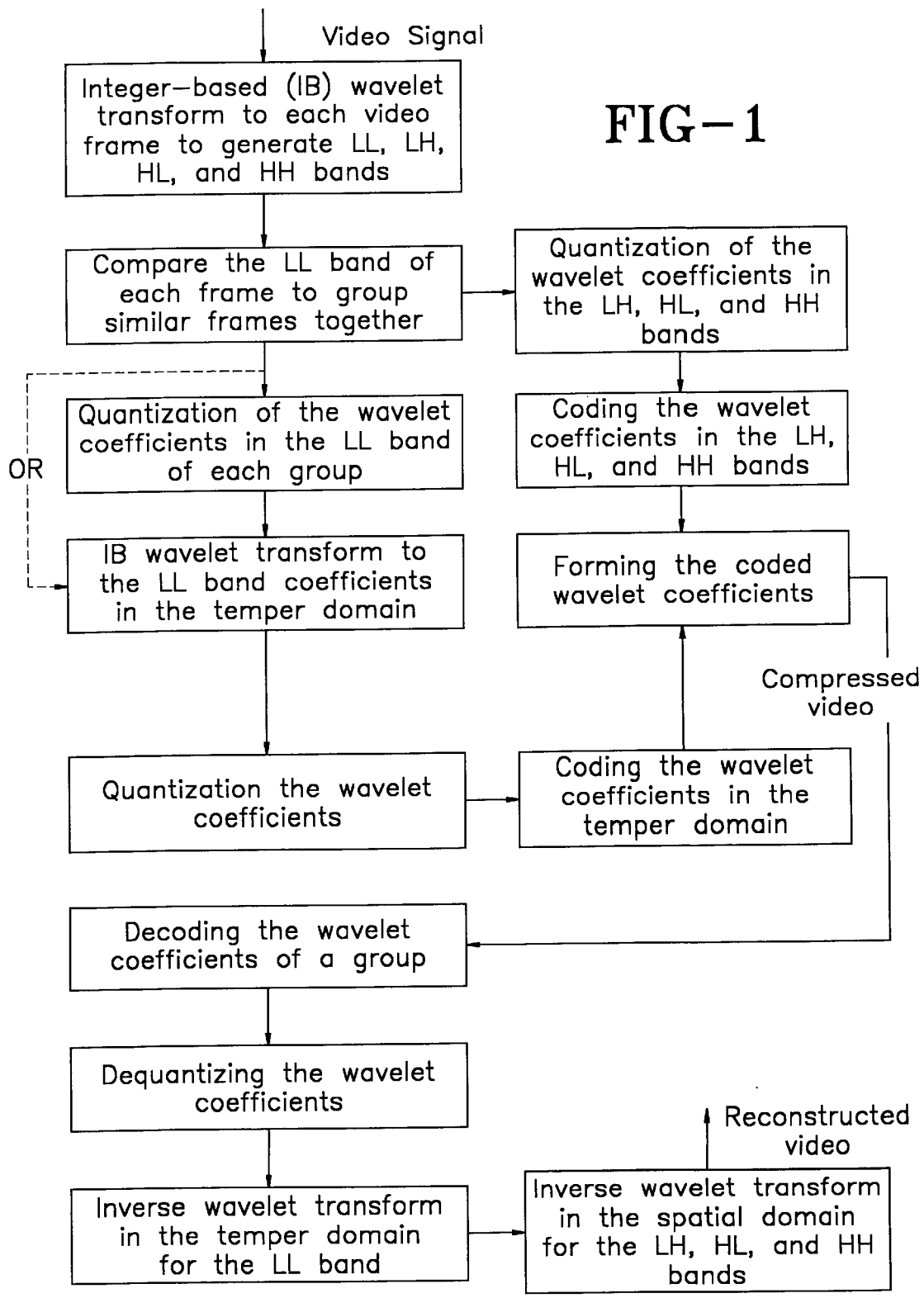
FIG. 1 is a flowchart of the dynamic 3D wavelet compression and decompression method of the present invention.

Referring to FIG. 1, a flowchart of the dynamic 3D wavelet compression and decompression method of the present invention is shown. The flowchart describes the video compressing method provided by the present invention. The functionality or processing described at each step in the flowchart may implement corresponding software and/or hardware components. The method of the present invention uses the integer-based (IB) wavelet transform in all the three directions of the video information including the x and y directions in the spatial domain and the t direction in the temporal domain. The IB wavelet transform needs less computation time than the floating-point arithmetic and is thus suitable for real-time applications.

In step 100, IB wavelet transform is applied to each video to generate LL, LH, HL, and HH bands. In step 102, the LL band of each frame is compared to create groups of similar frames. Frames that meet a certain threshold value are grouped together. The video compression scheme of the present invention organizes multiple frames in groups for applying the wavelet transform in the t direction to achieve a high compression ratio. The frames contained in one group have similar content. Because the frames are similar and the number of frames can be very large (as many as 1024 frames), the redundancy in the temporal domain can be fully exploited for compression purposes. As a result, a very high compression ratio can be achieved. It provides compression ratio of 0.025–0.25 bit per pixel and generates good quality video. The present invention plays back video information at various frame sizes and rates such as 176×144 or 360×240 pixels and 5–30 fps.

In step 104, wavelet coefficients in the LH, HL, and HH bands are quantized while in step 106, wavelet coefficients in the LL bands of each frame group are quantized. As an alternative to step 106, in step 110, IB wavelet transform may be applied to the LL band coefficients in the temporal domain. In step 114, the wavelet coefficients from step 106 or 110 are quantized. In step 108, the wavelet coefficients in the LH, HL, and HH bands are coded. In step 116, the wavelet coefficients in the temporal domain are coded. In step 112, the coded wavelet coefficients are formed based on the results of steps 108 and 116. The result of the process is a compressed video.

In the decompression steps 118, 120, 122, and 124, the wavelet coefficients in each frame group are decoded. Next, the wavelet coefficients are dequantized. The inverse wavelet transform is applied in the temporal domain for the LL band and in the spatial domain for the LH, HL, and HH bands. Details regarding each of the steps shown in FIG. 1 follows.

1. Packed Integer-Based Wavelet Transform

A. Integer-Based Wavelet Transform

The first step in this novel compression method is to apply the integer-based (IB) wavelet transform to each frame of the video. The reason for using the IB wavelets is to speed up the computation because it can be implemented much faster than floating point wavelets in all general purpose computers. Another benefit is the reversibility, i.e., the image may be reconstructed losslessly because the coefficients are integers and may be stored without round-off errors. IB-based wavelets are preferable for the 3D wavelet transform because the computation cost is increased by n times where n is the number of frames involved in a dynamic group in comparison with the 2D wavelet transform, especially when n is very large.

Figure 2:
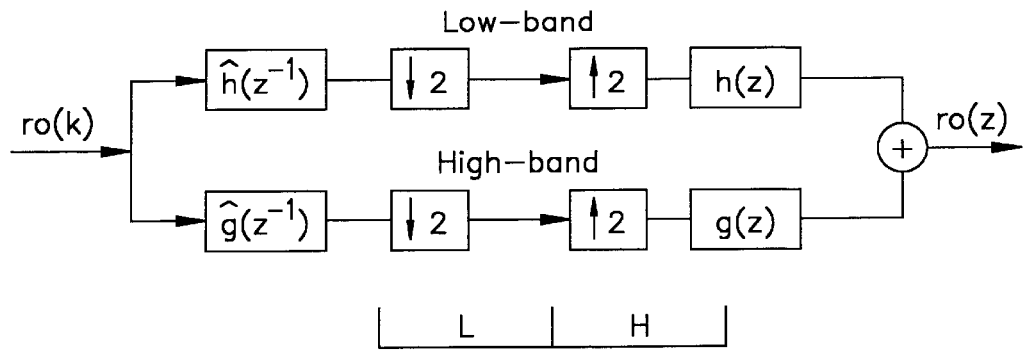
FIG. 2 illustrates typical wavelet and inverse wavelet transforms to a one-dimensional signal.

Referring to FIG. 2, the IB wavelet transform is illustrated in connection with a one-dimensional signal $r_0(n)$. Applying the wavelet analysis to $r_0(n)$, the forward transform uses two analysis filters $\hat{h}$ (low-pass) 130 and $\hat{g}$ (high-pass) 132 while the inverse transform first up-samples and then uses two synthesis filters h (low-pass) and g (high-pass). The conditions for perfect reconstruction of $r_0(n)$ are:

$$h(z)\hat{h}(Z^{-1})+g(z)\hat{g}(Z^{-1})=2 \quad (1)$$

$$h(z)\hat{h}(-Z^{-1})+g(z)\hat{g}(-Z^{-1})=0. \quad (2)$$

By using a lifting scheme ([5]) with two lifting filters s and t, the computation involved in (1) and (2) can all be integer, in which the forward transformation including the following steps:

a. Subband splitting by applying the wavelet analysis filters $(\hat{h}, \hat{g})$ to $r_0(n)$, the corresponding low-pass and high-pass subbands are $r_{1,0}(k)$ and $d_{1,0}(k)$, respectively. Update the low subband $r_{1,0}(k)$ by applying the s filter on the high subband $$d_1(k)=d_{1,0}(k).$$

$$r_1(k)=r_{1,0}(k)+\text{Int}(\Sigma_n d_1(k-n)s(n)) \quad (3)$$

or, update of the high subband d1(k−n) by applying the t filter on the low subband $r_1(k)=r_{1,0}(k)$.

$$d_1(k)=d_{1,0}(k)+\text{Int}(\Sigma_n r_1(k-n)t(n)) \quad (4)$$

For inverse transform, the steps are:

a. Undo the primal lifting with $d_{1,0}(k)=d(k)$, or undo the dual lifting with $r_{1,0}(k)=r_1(k)$. This is exactly the "backward" version of (3) and (4).

b. Inverse transform using the synthesis filter (h, g) on the low pass and high pass subbands $r_{1,0}(k)$ and $d_{1,0}(k)$, and get back the original signal $r_0(n)$.

If the parameters in s and t are carefully selected in (3) and (4), only integer addition, subtraction, and shift operations are required in the computation. The wavelet transform can be performed directly by integer arithmetic. For example, one of the (2, 6) wavelet that corresponds to the TS transform can be performed in the following way. The decomposition is calculated as:

$$d_{1,0}(k)=r_0(2k)-r_0(2k+1) \quad (5)$$

$$r_1(k)=\text{Int}(d_{1,0}(k)/2)+r_0(2k+1) \quad (6)$$

$$d_1(k)=\text{Int}\{[(r_1(k-1)-r_1(k+1)]/4\}-d_{1,0}(k). \quad (7)$$

Its reconstruction algorithm immediately follows as the decomposition operations are undone. Several other integer wavelet transforms, such as S transform, (5, 3) transform, and (S+P) transform, etc, can be modified and only need integer addition, subtraction, and shift operations.

The invention also includes a packed approached to further increase the speed of the computation. The approach is based on the fact that the 16-bit arithmetic has the same computation speed as the 32-bit integer arithmetic in contemporary computers while a 16-bit data unit is sufficient for the IB-based computation. Therefore, multiple pixels may be packed in a single long word during the computation of the reversible wavelet transform. As a result, operation on multiple pixels or wavelet coefficients can be performed at once, i.e., parallel computation at the pixel (wavelet coefficients) level.

B. Packed Computation

The invention provides a packed computation method for the IB wavelet transform. The basic idea of the packed integer wavelet transform is to pack multiple pixels (wavelet coefficients) in one integer word. Therefore, multiple additions/subtractions can be accomplished in one instruction cycle. In general, multiple coefficients can be packed into one integer provided that the width of the data-path is sufficient. Because 32-bit is a typical word width for the state-of-the-art computers, the present example focuses on packing two pixels/coefficients into one 32-bit integer in the implementation. This example does not mean that the method is limited to 32-bit machines. If the word width is increased to 64-bits, one can pack four coefficients in a single word. The method of the packed integer wavelet decomposition takes the following steps:

a. Pack two rows/columns

Let $r_0(2n,k)$ and $r_0(2n+1, k)$ be the 2nth and (2n+1)th row or column, respectively. Suppose the packed result is saved in $r_{0s}(k)$. Then, $$r_{0s}(k)=(r_0(2n,k), r_0(2n+1,k)). \quad (8)$$

Compute the packed wavelet transform using the filters (ĥ, ĝ). The algorithms are the same as (3) and (4) except that we use ros(n) as the input instead of $r_0(n)$. The intermediate results $\{r_{1,0}(k), d_{1,0}(k)\}$ and the final results $\{r_1(k), d_1(k)\}$ are also in packed format, which correspond to $\{r_{1,0s}(k), d_{1,0s}(k)\}$ and $\{r_{1s}(k), d_{1s}(k)\}$.

b. Unpack two rows/columns $$r_1(2n,k)=HW(r_{1s}(k)),\ r_1(2n+1,k)=LW(r_{1s}(k))$$

$$d_1(2n,k)=HW(d_{1s}(k)),\ d_1(2n+1,k)=LW(d_{1s}(k))$$

where HW(.) and LW(.) represent the high word and low word of the packed integer, respectively. Similarly, the method for packed wavelet reconstruction can be described as follows.

a. Pack two rows/columns $$r_{1s}(k)=(r_1(2n,k),\ r_1(2n+1,k)),$$

$$d_{1s}(k)=(d_1(2n,k),\ d_1(2n+1,k)).$$

b. Undo the packed primal and/or dual lifting. The reconstructed signal is in packed format $r_{0s}(k)$.

c. Unpack two rows/columns $$r_0(2n,k)=HW(r0s(k)),\ r_0(2n+1,k)=LW(r_{0s}(k)).$$

Figure 3:
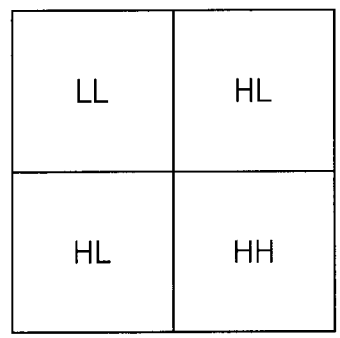
FIG. 3 illustrates the 2D wavelet transform applying to a single image which generates the LL, LH, HL, and HH bands.

The first level of the transform generates four sub-bands 140 in the spatial domain, $LL_1$, $LH_1$, $HL_1$, and $HH_1$ as shown in FIG. 3. The IB wavelet transform is applied to the $LL_1$ band again to generate four new subbands $LL_2$, $LH_2$, $HL_2$, and $HH_2$. This process can continue until one reaches level m with $LL_m$, $LH_m$, $HL_m$, and $HH_m$. The level of decomposition using wavelet transform may vary.

2. Dynamic Grouping of Similar Images

Once the 2D wavelet transform is applied to each frame, the difference between the current frame and the previous frame is examined using the following formula:

$$\Sigma D_{i,j}=\Sigma(LL_{m,i}-LL_{m,j}),\ j=i+1,\ i+2 \quad (9)$$

where $LL_{m,i}$ is the low-low band of frame i at the final level of decomposition, $LL_{m,j}$ is the same of frames j, and $\Sigma$ means the summation of all the coefficients in the band. If the difference $\Sigma D_{i,j}$ is less than a threshold T, frame j is put in the same group as frame i. This process for calculating the difference continues until frame j+1 which is significantly different from frame i. Then, frames i to j are put in the same group. This process starts from the very first frame of the video, i.e., i=1. Because the number of similar frames varies between the groups according to the content of the video, it is called dynamic grouping. Examining the difference of the low-low band of the wavelet transform instead of the content of the entire image makes the comparison efficient. By grouping many similar frames together, redundancy can be explored from the largest possible group of frames.

Figure 4:
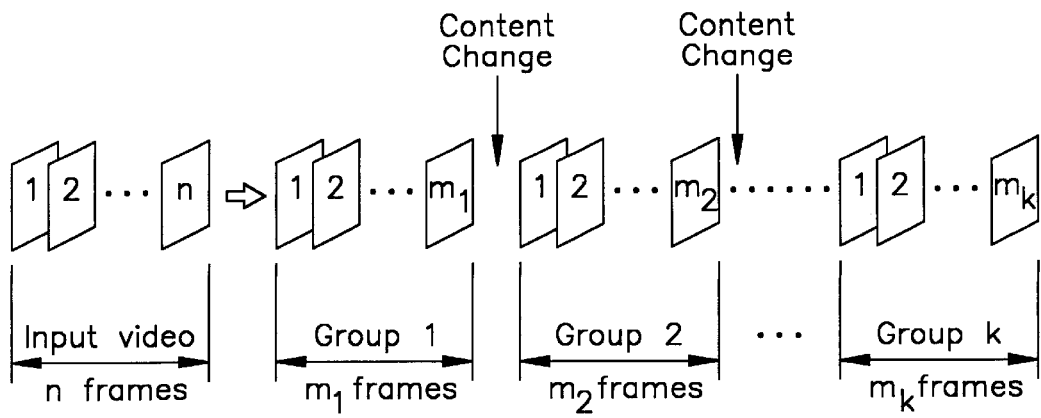
FIG. 4 is a flow diagram of the dynamic grouping of video frames method of the present invention.

Referring to FIG. 4, a flow diagram illustrating the process of grouping frames in accordance with the present invention is shown. In accordance with the process, a series of input frames 150 are examined for content changes. Initially, the frames are assigned to a group (e.g., Group 1) 152. When a content change is detected 156, a new group is formed (e.g., Group 2) 154 and subsequent frames are assigned to the new group. The process continues and another group is formed when the next content change in the input frames is detected 158. Preferably, each input frame is assigned to a group.

3. Double-Quantization of the Wavelet Coefficients in the 2D and 3D Wavelet Transforms Quantization is performed on the result of the 2D wavelet transform before the wavelet transform is performed in the temporal domain. That is, the final wavelet transform is performed on the quantized wavelet coefficients and the results of the transform are quantized again. This double-quantization method has a major advantage. The compression ratio in the spatial domain may be set independent of the compression ratio in the temporal domain. Consequently, a low compression ratio may be set in the temporal domain when the video has fast motions and a high one may be set when it has slow motions. When a constant bit rate is required, the compression ratio in the spatial domain (intra frames) may be changed to the one in the temporal domain (between frames).

Figure 5:
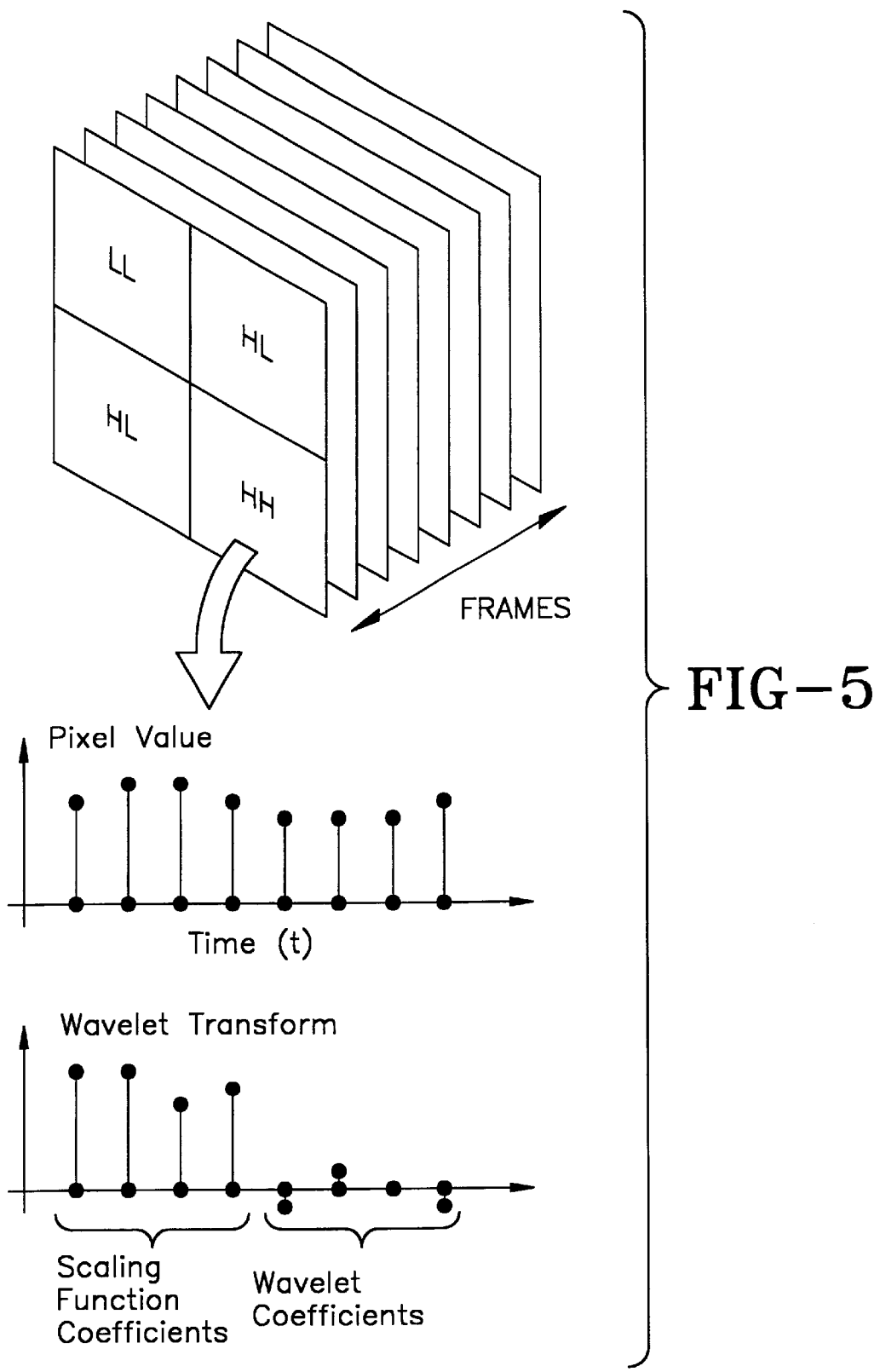
FIG. 5 is an illustration of wavelet transform in the temporal domain in accordance with the method of the present invention.

Referring to FIG. 5, an illustration of wavelet transform in the temporal domain in accordance with the method of the present invention is shown. Frames 170 are divided into four bands by applying IB wavelet transforms to each frame, as described previously. Within each band, corresponding pixel values are evaluated over time 172. In accordance with the wavelet transform in the temporal domain, scaling function coefficients and wavelet coefficients are calculated 174.

Figure 6:
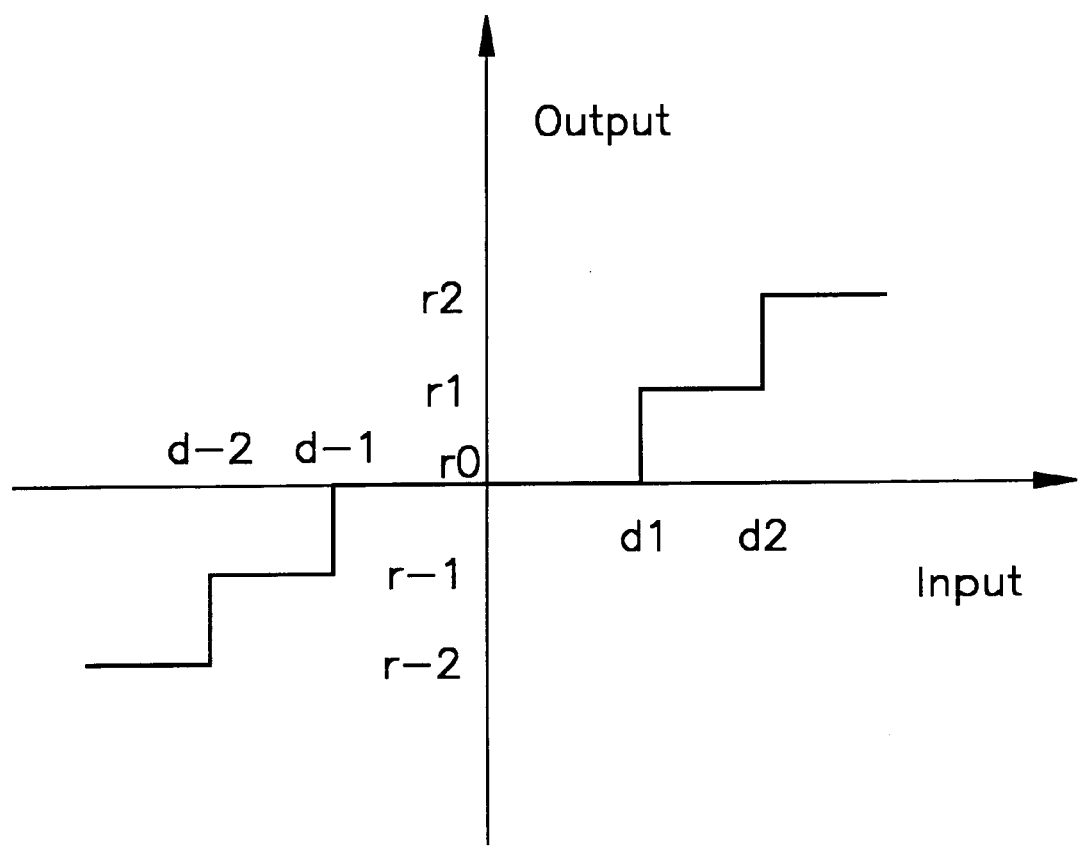
FIG. 6 illustrates the adaptive quantization method.

The purpose of quantization is to compress the information by representing the wavelet coefficients in lower precision numbers which is just enough to achieve a desired video quality. It is the major source of the quality loss in wavelet-based compression. Quantization results in changes to the magnitude of the wavelet coefficients which in turn changes the magnitude of the pixel values of the reconstructed video. However, if only insignificant wavelet coefficients are eliminated, the reconstructed video is not significantly distorted. Mathematically, quantization is a many-to-one mapping. That is, all the values falling in a range are mapped into a single value. As a result, fewer bits are needed to represent the output values than are needed to represent the input values. A uniform quantizer with a so-called dead zone may be used. The operation of the uniform quantizer is shown in FIG. 6. In FIG. 6, ($\ldots, r_{-1}, r_0, r_1, \ldots$) are called the reconstruction levels and ($\ldots, d_{-1}, d_0, d_1, \ldots$) are called decision levels. Any input values between $d_n$ and $d_{n+1}$ are mapped into a single value of $r_n$ while the input value between $d_{-1}$ and $d_1$ is mapped into zero. The distance between $d_{-1}$ and $d_1$, i.e., $\Delta 0 = 2d_1$ is called a dead zone, and the distance between two decision levels $\Delta = d_{n+1} - d_n$ is called step size. Because of the dead zone, all the insignificant coefficients which are essentially noise are eliminated after the quantization. An adaptive dead zone approach may be used. That is, the dead zone is programmable depending on the required compression ratio. A larger dead zone eliminates more insignificant wavelet coefficients.

From the above presentation it is apparent that the third wavelet transform in the temporal domain is on the wavelet coefficients that are represented by fewer bits after the quantization. Thus, the computation time for the wavelet transform can be significantly reduced. Reduction in computation time is another advantage of the double-quantization method.

4. Hybrid 2D–3D Wavelet Transform

When the frame size is larger than 360 by 240 pixels, for example, it may be impossible for some computers to achieve real-time computation of the 3D wavelet transform. Another element of the present invention solves this problem. The 2D–3D hybrid wavelet transform may be used when the available computational power is insufficient to achieve real-time computation. The 3D wavelet transform is applied to the $LL_n$ band where $n=1, \ldots, m$. For a larger n, there are fewer wavelet coefficients in the $LL_n$ band. The value n may be chosen according to the trade-off between the required compression ratio and the computational speed of the computer. At a minimum, the $LL_1$ band may reduce the number of the wavelet coefficients by four times. Because the total number of the wavelet coefficients involved in the third wavelet transform is reduced, the computation time is proportionally reduced as well.

After the quantization in the spatial domain, a significant portion of the wavelet coefficients in the $LH_n$, $HH_n$, and $HH_n$ bands have been reduced to zero. It is unlikely there will be much room for further compressing the information in the $LH_n$, $HL_n$, and $HH_n$ bands if the third wavelet transform is applied to those coefficients. As a result, excluding those bands from the third wavelet transform has a minor effect on the final compression ratio. The computation time, on the other hand, is significantly reduced.

After the third wavelet transform, there are resulting sub-bands in both spatial and temporal domain, i.e., $LLL_p$, $LLH_p$, $LHL_p$, $LHH_p$, $HLL_p$, $HLH_p$, $HHL_p$, and $HHH_p$ where $p=1, 2, \ldots$, represents the decomposition level in the temporal domain.

Figure 7:
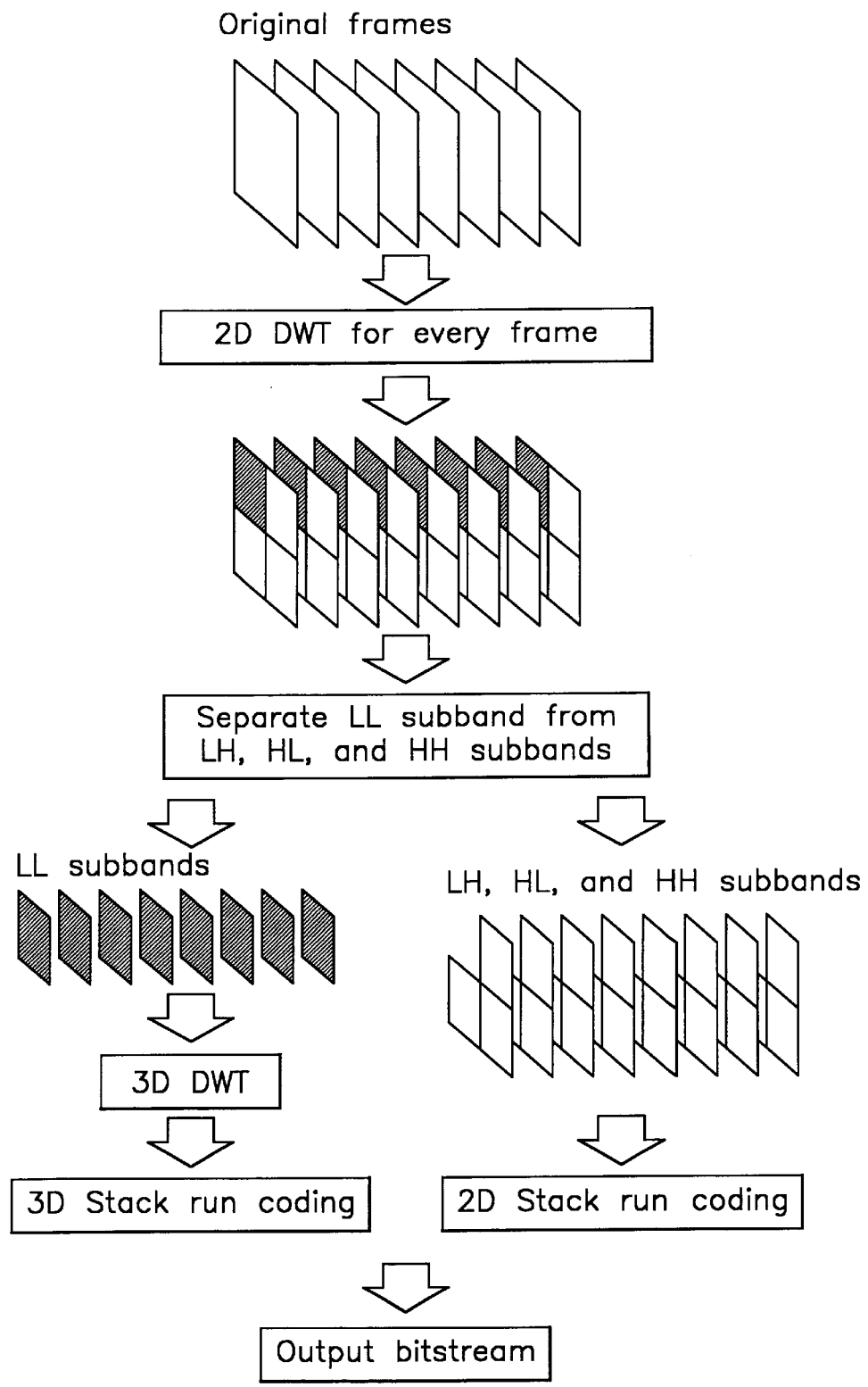
FIG. 7 is a flow diagram of the 2D–3D hybrid wavelet transform method of the present invention.

Referring to FIG. 7, a flow diagram of the 2D–3D hybrid wavelet transform method of the present invention is shown. In step 180, original frames comprising video data are processed according to step 182 such that 2D dynamic wavelet transform is applied to every frame to create LL, LH, HL, and HH subbands 184. In step 186, the LL subband is separated from the LH, HL, and HH subbands for further processing. A 3D dynamic wavelet transform 192 is applied to the LL subbands. The resulting data is stack run encoded 194 and added to the output bitstream 198. The LH, HL, and HH subbands 190 are processed in accordance with 2D stack run encoding 196. The resulting data is added to the output bitstream 198.

5. Encoding the Quantized Wavelet Coefficients

Once quantized, many wavelet coefficients in the $LLL_p$, $LLH_p$, $LHL_p$, $LHH_p$, $HLL_p$, $HLH_p$, $HHL_p$, and $HHH_p$ subbands become zero. Thus, each sub-band may be considered a sparse matrix. An encoder is responsible for compressing the sparse matrix losslessly such that the wavelet coefficients may be represented by a minimal number of bits. There are a number of encoding methods available such as zero-tree coding mentioned by J. Shapiro: U.S. Pat. Nos. 5,315,670, 5,321,776, and 5,412,741, Huffman coding, arithmetic coding. For real-time applications that require fast computation, run-lengths of zeroes followed by non-zero wavelet coefficients is an effective approach. In that approach, many consecutive zeroes can be combined and represented by very few bits to achieve compression. For even more efficient coding, the stack-run coding method based on the run-length idea is used in the compression method ([6]).

The present invention is suitable for a wide range of applications: real-time transmission of video on the Internet, video on demand using either low or high speed connections, and distance-learning, etc. It may further be applied to audio data. The method may be implemented by low-power IC chips because the computation is integer-based. This approach makes the method especially suitable for hand-held wireless devices. While particular embodiments of the invention have been illustrated and described, various modifications and combinations can be made without departing from the spirit and scope of the invention, and all such modifications, combinations, and equivalents are intended to be covered and claimed.

What is claimed is:

1. A method for real-time compression of video data comprising the steps of:

(a) applying 2D wavelet transform to each video frame to generate LL, LH, HL, and HH bands;

(b) applying 2D wavelet transform to each video frame in the LL band to create LL, LH, HL, and HH subbands;

(c) within each LL band or subband,
   (i) comparing a current video frame to a next video frame to compute a difference between the frames;
   (ii) assigning the current video frame to a current group if the difference is less than or equal to a threshold;
   (iii) assigning the current video frame to a new group if the difference is greater than the threshold;

(d) quantizing the wavelet coefficients from the LH, HL, and HH bands resulting from step (a);

(e) quantizing the wavelet coefficients from the LL subband resulting from step (b);

(f) applying wavelet transform in the temporal domain to the quantized wavelet coefficients resulting from step (e);

(g) quantizing the wavelet coefficients resulting from step (f);

(h) encoding the quantized wavelet coefficients resulting from step (d);

(i) encoding the quantized wavelet coefficients resulting from step (g);

(j) outputting the encoded quantized wavelet coefficients from steps (h) and (i).

2. The method of claim 1 wherein the step of applying 2D wavelet transform to each video frame and band to generate LL, LH, HL, and HH bands and subbands comprises the step of applying integer-based wavelet transform to each video frame or band.

3. The method of claim 2 wherein the step of applying integer-based wavelet transform comprises the step of applying a packed computation method to the integer-based wavelet transform.

4. The method of claim 1 wherein the step of comparing a current video frame to a next video frame to compute a difference between the frames comprises the step of comparing the value of the wavelet coefficients of the LL bands or subbands.

5. The method of claim 1 further comprising the step of applying 2D wavelet transform to the LL subband of each frame after step (c).

6. The method of claim 1 further comprising the steps of:
   (k) decoding the encoded quantized wavelet coefficients of the plurality of frame groups;
   (l) decoding the encoded quantized wavelet coefficients of the LH, HL, and HH bands;
   (m) dequantizing wavelet coefficients in the plurality of frame groups;
   (n) dequantizing wavelet coefficients in the LH, HL, and HH bands;
   (o) applying an inverse wavelet transform in the temporal domain of the LL bands;
   (p) applying an inverse wavelet transform in the spatial domain of the LL, LH, HL, and HH bands; and
   (q) outputting decompressed video data resulting from steps (p).

7. A method for real-time compression of video data comprising the steps of:
   (a) applying 2D wavelet transform to each video frame to generate LL, LH, HL, and HH bands;
   (b) within the LL band,
      (i) comparing a current video frame to a next video frame to compute a difference between the frames;
      (ii) assigning the current video frame to a current group if the difference is less than or equal to a threshold;
      (iii) assigning the current video frame to a new group if the difference is greater than the threshold;
   (c) for each group created in accordance with step (b), applying 3D wavelet transform to the LL band of all the frames in the group;
   (d) quantizing the wavelet coefficients resulting from step (c);
   (e) encoding the quantized wavelet coefficients resulting from step (d);
   (f) quantizing the wavelet coefficients from the LH, HL, and HH bands;
   (g) encoding the quantized wavelet coefficients resulting from step (f); and
   (h) outputting the encoded quantized wavelet coefficients from steps (e) and (g).

8. The method of claim 7 wherein the step of applying 2D wavelet transform to each video frame to generate LL, LH, HL, and HH bands comprises the step of applying integer-based wavelet transform to each video frame.

9. The method of claim 8 wherein the step of applying integer-based wavelet transform comprises the step of applying a packed computation method to the integer-based wavelet transform.

10. The method of claim 7 wherein the step of quantizing wavelet coefficients in step (c) comprises the step of quantizing wavelet coefficients in accordance with the adaptive dead zone method.

11. The method of claim 7 wherein the steps of encoding the quantized wavelet coefficients from steps (e) and (g) comprises the step of stack run encoding the wavelet coefficients.

12. The method of claim 7 further comprising the steps of:
   (i) decoding the encoded quantized wavelet coefficients of the plurality of frame groups of the LL band;
   (j) decoding the encoded quantized wavelet coefficients of the LH, HL, and HH bands;
   (k) dequantizing wavelet coefficients in the LH, HL, and HH bands;
   (l) dequantizing wavelet coefficients in the plurality of frame groups of the LL band;
   (m) applying an inverse wavelet transform in the temporal domain of the LL subband;
   (n) applying an inverse wavelet transform in the spatial domain of the LL, LH, HL, and HH bands; and
   (o) outputting decompressed video data resulting from step (n).

13. A method decompressing video data comprising the steps of:
   (a) decoding the encoded quantized wavelet coefficients of a plurality of frame groups of the LL band;
   (b) dequantizing quantized wavelet coefficients in the plurality of frame groups of the LL band;
   (c) decoding the encoded quantized wavelet coefficients of LH, HL, and HH bands;
   (d) dequantizing quantized wavelet coefficients in the LH, HL, and HH bands;
   (e) applying an inverse wavelet transform in the temporal domain of the LL band;
   (f) applying an inverse wavelet transform in the spatial domains of the LL, LH, HL, and HH bands; and
   (g) outputting decompressed video data resulting from step (f).

14. The method of claim 13 wherein the steps of applying an inverse wavelet transform in the temporal domain of the LL band and the spatial domain of the LL, LH, HL, and HH bands comprises the steps of applying an inverse integer-based wavelet transform.

15. The method of claim 13 wherein the step of dequantizing wavelet coefficients in step (b) comprises the step of dequantizing wavelet coefficients in accordance with the adaptive dead zone method.

16. The method of claim 13 wherein the steps of decoding quantized wavelet coefficients from steps (a) and (c) comprises the step of stack run decoding the wavelet coefficients.

17. A method for real-time compression of video data comprising the steps of:
- (a) applying 2D wavelet transform to each video frame to decompose an image into LL, LH, HL, and HH subbands;
- (b) within the LL subbands,
  - (i) comparing a current video frame to a next video frame to compute a difference between the frames;
  - (ii) assigning the current video frame to a current group if the difference is less than or equal to a threshold;
  - (iii) assigning the current video frame to a new group if the difference is greater than the threshold;
- (c) for each group created in accordance with step (b), applying 3D wavelet transform to all the frames in the group;
- (d) quantizing the wavelet coefficients resulting from step (c);
- (e) encoding the quantized wavelet coefficients resulting from step (d); and
- (f) outputting the encoded quantized wavelet coefficients from steps (e).

18. The method of claim 17 wherein the step of applying 2D wavelet transform to each video frame to generate LL, LH, HL, and HH subbands comprises the step of applying integer-based wavelet transform to each video frame.

19. The method of claim 18 wherein the step of applying integer-based wavelet transform comprises the step of applying a packed computation method to the integer-based wavelet transform.

20. The method of claim 17 wherein the step of quantizing wavelet coefficients in step (d) comprises the step of quantizing wavelet coefficients in accordance with the adaptive dead zone method.

21. The method of claim 17 wherein the step of encoding the quantized wavelet coefficients comprises the step of stack run encoding the quantized wavelet coefficients.

22. The method of claim 17 further comprising the steps of:
- (g) decoding the encoded quantized wavelet coefficients of the plurality of frame groups of the LL, LH, HL, and HH subbands;
- (h) dequantizing wavelet coefficients in the plurality of frame groups of the LL, LH, HL, and HH subbands;
- (i) applying an inverse wavelet transform in the temporal domain of the LL, LH, HL, and HH subbands; and
- (j) outputting decompressed video data resulting from step (i).

* * * * *

UNITED STATES PATENT AND TRADEMARK OFFICE
CERTIFICATE OF CORRECTION

PATENT NO.    : 6,801,573 B2
DATED         : October 5, 2004
INVENTOR(S)   : Zheng It is certified that error appears in the above-identified patent and that said Letters Patent is hereby corrected as shown below:

Title page,
Item [56], References Cited, OTHER PUBLICATIONS, please add

-- ISO/IEC 11172-2, Coding of moving pictures and associated audio for digital storage media at up to 1.5 Mbps. Technical Report, MPEG (Moving Pictures Expert Group), International Organization for Standardization, 1993.

Didier Le Gall, "MPEG: a video compression standard for multimedia applications," Communications of the ACM, Vol. 34, No. 4, pp. 47-63, April, 1991.

ISO/IEC 13818-2, Generic coding of moving pictures and associated audio information. Technical Report, MPEG (Moving Pictures Expert Group), International Organization for Standardization, 1994.

ISO/IECJTC1/SC29/WG11 N2725, Overview of the MPEG-4 standard, 1999.

I. Daubechies and W. Sweldens, "Factoring wavelet transforms into lifting steps," J. Fouries Anal. Appl., 4(no.3), pp. 247-269, 1998.

M. Tsai, J. Villasenor, and F. Chen, "Stark-run image coding," IEEE Trans. on Circuits and Systems for Video Technology, 6(5): 519-521, 1996. --.

Item [74], *Attorney, Agent or Firm*, please delete "Stadley Law Group LLP" and insert -- Standley Law Group LLP --.

Column 5,
Line 67, please delete "ros(n)" and insert -- $r_{os}(n)$ --.

Column 6,
Line 35, please delete "$\Sigma D_{ij} = \Sigma\ (LL_{m,i}\text{-}LL_{m,j}), j=i+1, i+2$" and insert
-- $\Sigma Dij = \Sigma(LL_{m,i}\text{-}LL_{m,j}), j=i+1, i+2, ...$ --.

UNITED STATES PATENT AND TRADEMARK OFFICE
CERTIFICATE OF CORRECTION

PATENT NO. : 6,801,573 B2
DATED : October 5, 2004
INVENTOR(S) : Zheng

It is certified that error appears in the above-identified patent and that said Letters Patent is hereby corrected as shown below:

Column 8,
Line 6, please delete "$LH_n$, $HH_n$, and $HH_n$" and insert -- $LH_n$, $HL_n$, and $HH_n$ --.

Signed and Sealed this

Fifteenth Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,801,573 B2
DATED : October 5, 2004
INVENTOR(S) : Zheng

It is certified that error appears in the above-identified patent and that said Letters Patent is hereby corrected as shown below:

Title page,
Item [56], References Cited, OTHER PUBLICATIONS, please add
-- ISO/IEC 11172-2, Coding of moving pictures and associated audio for digital storage media at up to 1.5 Mbps. Technical Report, MPEG (Moving Pictures Expert Group), International Organization for Standardization, 1993.
Didier Le Gall, "MPEG: a video compression standard for multimedia applications," Communications of the ACM, Vol. 34, No. 4, pp. 47-63, April, 1991.
ISO/IEC 13818-2, Generic coding of moving pictures and associated audio information. Technical Report, MPEG (Moving Pictures Expert Group), International Organization for Standardization, 1994.
ISO/IECJTC1/SC29/WG11 N2725, Overview of the MPEG-4 standard, 1999.
I. Daubechies and W. Sweldens, "Factoring wavelet transforms into lifting steps," J. Fouries Anal. Appl., 4(no.3), pp. 247-269, 1998.
M. Tsai, J. Villasenor, and F. Chen, "Stark-run image coding," IEEE Trans. on Circuits and Systems for Video Technology, 6(5): 519-521, 1996. --.

Item [74], *Attorney, Agent or Firm*, please delete "Stadley Law Group LLP" and insert -- Standley Law Group LLP --.

Column 5,
Line 67, please delete "ros(n)" and insert -- $r_{os}(n)$ --.

Column 6,
Line 35, please delete "$\Sigma D_{ij} = \Sigma(LL_{m,i}-LL_{m,j})$, $j=i+1, i+2$" and insert -- $\Sigma Dij = \Sigma (LL_{m,i}-LL_{m,j}), j = i+1, i+2, ...$ --.

UNITED STATES PATENT AND TRADEMARK OFFICE
CERTIFICATE OF CORRECTION

PATENT NO.      : 6,801,573 B2
DATED           : October 5, 2004
INVENTOR(S)     : Zheng It is certified that error appears in the above-identified patent and that said Letters Patent is hereby corrected as shown below:

Column 8,
Line 6, please delete "$LH_n$, $HH_n$, and $HH_n$" and insert -- $LH_n$, $HL_n$, and $HH_n$ --.

This certificate supersedes Certificate of Correction issued February 15, 2005.

Signed and Sealed this

Third Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,801,573 B2  
DATED : October 5, 2004  
INVENTOR(S) : Zheng

Page 1 of 2

It is certified that error appears in the above-identified patent and that said Letters Patent is hereby corrected as shown below:

Title page,
Item [56], References Cited, OTHER PUBLICATIONS, please add

-- ISO/IEC 11172-2, Coding of moving pictures and associated audio for digital storage media at up to 1.5 Mbps. Technical Report, MPEG (Moving Pictures Expert Group), International Organization for Standardization, 1993.

Didier Le Gall, "MPEG: a video compression standard for multimedia applications," Communications of the ACM, Vol. 34, No. 4, pp. 47-63, April, 1991.

ISO/IEC 13818-2, Generic coding of moving pictures and associated audio information. Technical Report, MPEG (Moving Pictures Expert Group), International Organization for Standardization, 1994.

ISO/IECJTC1/SC29/WG11 N2725, Overview of the MPEG-4 standard, 1999.

I. Daubechies and W. Sweldens, "Factoring wavelet transforms into lifting steps," J. Fouries Anal. Appl., 4(no.3), pp. 247-269, 1998.

M. Tsai, J. Villasenor, and F. Chen, "Stark-run image coding," IEEE Trans. on Circuits and Systems for Video Technology, 6(5): 519-521, 1996. --.

Item [74], *Attorney, Agent or Firm*, please delete "Stadley Law Group LLP" and insert -- Standley Law Group LLP --.

Column 5,
Line 67, please delete "ros(n)" and insert -- $r_{os}(n)$ --.

Column 6,
Line 35, please delete "$\Sigma D_{i,j} = \Sigma(LL_{m,i} - LL_{m,j}), j=i+1, i+2$" and insert
-- $\Sigma Di,j = \Sigma (LL_{m,i} - LL_{m,j}), j = i+1, i+2, ...$ --.

UNITED STATES PATENT AND TRADEMARK OFFICE
CERTIFICATE OF CORRECTION

PATENT NO. : 6,801,573 B2
DATED : October 5, 2004
INVENTOR(S) : Zheng

It is certified that error appears in the above-identified patent and that said Letters Patent is hereby corrected as shown below:

Column 8,
Line 6, please delete "$LH_n$, $HH_n$, and $HH_n$" and insert -- $LH_n$, $HL_n$, and $HH_n$ --.

This certificate supersedes Certificate of Correction issued February 15, 2005 and May 3, 2005.

Signed and Sealed this

Twenty-sixth Day of July, 2005

JON W. DUDAS
*Director of the United States Patent and Trademark Office*